US006970262B1

(12) United States Patent
Saito

(10) Patent No.: US 6,970,262 B1
(45) Date of Patent: Nov. 29, 2005

(54) COLOR IMAGE COMMUNICATION APPARATUS

(75) Inventor: Toshiaki Saito, Moriya-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 09/656,015

(22) Filed: Sep. 7, 2000

(30) Foreign Application Priority Data

Sep. 10, 1999 (JP) ................................ 11-257340

(51) Int. Cl.[7] .......................... G06F 15/00; H04N 1/46; G03G 15/01; G03G 15/10

(52) U.S. Cl. ..................... 358/1.15; 358/1.1; 358/501; 399/28; 399/61

(58) Field of Search ................................ 358/1.15, 1.9, 358/401, 403, 500, 501, 1.16, 523, 524, 530, 358/407, 426.05, 444, 1.1, 503; 347/49, 50, 347/19; 702/55; 379/100.01, 100.06; 399/28, 399/61, 106, 134

(56) References Cited

U.S. PATENT DOCUMENTS 4,313,124 A 1/1982 Hara .......................... 346/140
4,345,262 A 8/1982 Shirato et al. .............. 346/140
4,459,600 A 7/1984 Sato et al. .................. 346/140
4,463,359 A 7/1984 Ayata et al. ................. 346/1.1
4,558,333 A 12/1985 Sugitani et al. ............. 346/140
4,723,129 A 2/1988 Endo et al. .................. 346/1.1
4,740,796 A 4/1988 Endo et al. .................. 346/1.1
5,392,133 A * 2/1995 Nakajima ................... 358/407
6,144,459 A * 11/2000 Satou ........................ 358/1.15
6,442,252 B1 * 8/2002 Fujise et al. ........... 379/100.01
2002/0089683 A1 * 7/2002 Moro et al. ................ 358/1.13

FOREIGN PATENT DOCUMENTS

JP 54-56847 5/1979
JP 59-123670 7/1984
JP 59-138461 8/1984
JP 60-71260 4/1985

* cited by examiner

*Primary Examiner*—Kimberly Williams
*Assistant Examiner*—Thomas J. Lett
(74) *Attorney, Agent, or Firm*—Fitzpatrick, Cella, Harper & Scinto

(57) ABSTRACT

In a facsimile device enabling color and monochrome images to be received, setting can be made to validate an alternative memory reception function. With such setting, if setting is made to make color reception ability declaration in self machine ability declaration during call incoming and invalidate the alternative memory reception function, a printer unit judges whether color printing is enabled or not. If color recording is enabled, then color reception ability declaration is made in self machine ability declaration. If color printing is not enabled, then color reception ability declaration is not made.

10 Claims, 9 Drawing Sheets

COLOR IMAGE COMMUNICATION APPARATUS

BACKGROUND OF THE INVENTION

1. Field of the Invention

The present invention relates to an image communication apparatus capable of receiving color and monochrome images.

2. Related Background Art

With the heightened functionality of an image recorder, an image display device or the like in recent years, a color copying machine, a color printer, and so on, have gained more in popularity. For the image communication apparatus, color facsimile devices have been developed.

As regards a color facsimile communication system, standardization has been pursued with ITU-T Recommendations and, currently, T30, T4, T42 and T81 are in practice.

As regards a color recording system, there has been known an ink jet system or the like, which enables a user to select one from a black and other color ink cartridge as an ink cartridge to be loaded.

In the conventional color facsimile device, however, memory alternative reception was set when no color ink cartridges were present or when color reception was carried out. This situation made it impossible to record received images indefinitely, leaving color reception documents on a memory. Therefore, a limitation was placed on a usable memory and, in the reception/transmission process thereafter, a processing speed was adversely affected because of such a memory limitation. In addition, a large-capacity memory was needed to secure a sufficient usable memory, resulting in cost increases.

On the other hand, because of a high price of a color cartridge, in the facsimile machine, color reception or recording was carried out if not desired.

SUMMARY OF THE INVENTION

The present invention has been made to solve the foregoing problems, and an object of the invention is to provide a color image communication apparatus and its control method.

Another object of the invention is to provide an image communication apparatus and a method, capable of making proper ability declaration for its own according to the state of a recording unit of received image or the permission of memory reception.

Other objects of the invention will become apparent upon a reading of the following detailed description based on appended drawings and claims.

DETAILED DESCRIPTION OF THE PREFERRED EMBODIMENTS

First Embodiment

Next, the preferred embodiments of the present invention will be described in detail with the accompanying drawings.

Figure 1:
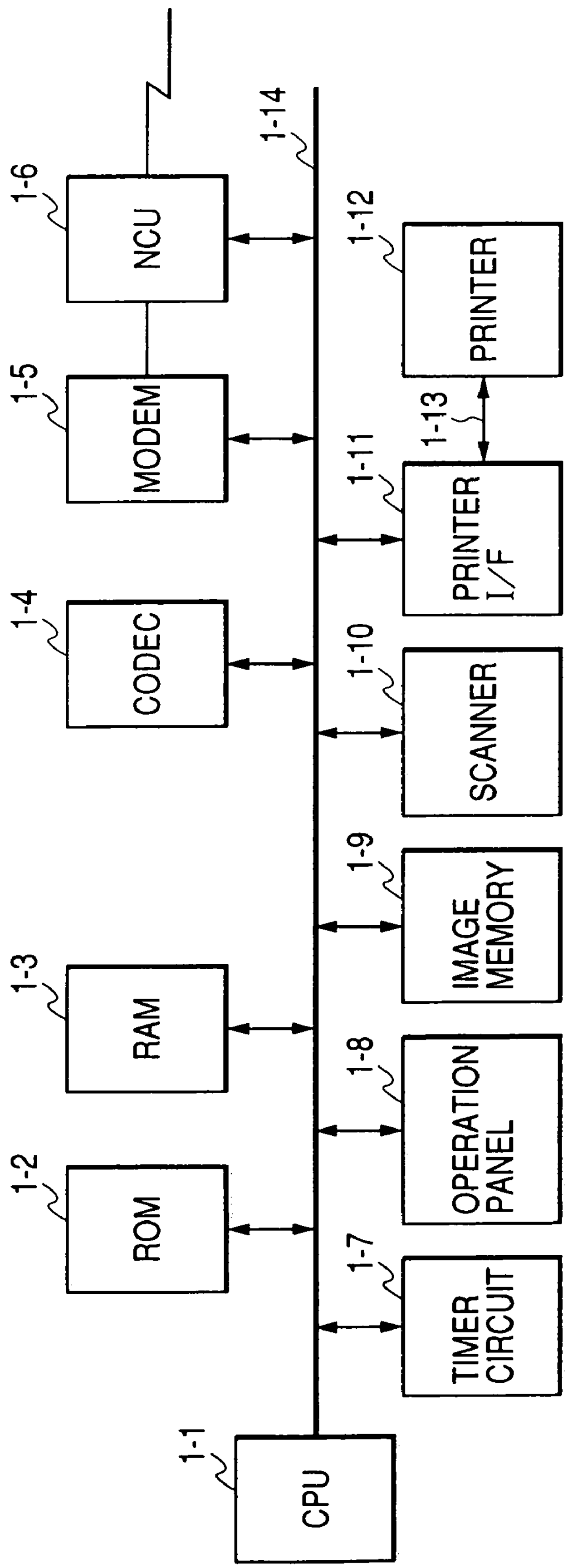
FIG. 1 is a block diagram showing a configuration of a color image communication apparatus.

FIG. 1 shows a first embodiment of the invention.

An image communication apparatus of the described embodiment is a facsimile device, which is provided with a G3 facsimile function and used by being connected to an analog telephone line. This device also includes a color image transmitting/receiving function.

In FIG. 1, a CPU 1-1 controls the entire device, and a ROM 1-2 is used as a program memory for various control operations executed by the CPU 1-1. A RAM 1-3 is used as a work area or the like for the CPU 1-1, backed up by a battery and adapted to prevent the volatilization of a stored content.

A codec unit 1-4 includes a raster/block conversion unit, a color converter and a JPEG encoding unit to constitute a transmission system, and a block-raster conversion unit, a color converter and a JPEG decoding unit to constitute a reception system. This codec unit 1-4 also includes a JPEG codec and a color conversion circuit, which are respectively designed to convert, when color component signals of RGB (Red, Green and Blue) are entered each as a multivalued signal of 8 bit/pixel, the signals into L*a*b* signal components, then execute JPEG base line encoding and output its result, and to decode, conversely when JPEG base line coded data is entered, the data to obtain each 8-bit multivalued data regarding L*a*b*, then make conversion from L*a*b* into CMYK and output its result.

A modem unit 1-5 is compliant with V8/V34/V17/V29/V27 ter of ITU-T Recommendation, and designed to modulate/demodulate a transmitted/received signal. A network control unit (NCU) 1-6 performs control or the like for connection with a telephone network. A timer circuit 1-7 includes a clock LSI or the like having a calendar function.

An operation panel 1-8 includes various operation keys and a display unit. An image memory 1-9 is composed of a semiconductor memory, and controlled in such a way as to store image data per page unit.

A color scanner 1-10 optically reads a document, decomposes the read data into RGB components, and outputs each color pixel as 8-bit multivalued data. In the embodiment, a color contact sensor is used as a reading device, and ADF mechanism is provided to automatically carry a plurality of documents to a reading position.

A printer interface unit 1-11 includes a binarization unit and an interface control unit, and controls connection with a printer unit 1-12 by a general-purpose interface based on Centronics specifications. When a multivalued signal of each CMYK color is entered, the general-purpose interface is controlled to convert each color data into binary data and transmit it to the printer. The printer interface unit 1-11 also has a function of detecting the state of the printer through the interface and notifying it to the CPU 1-1.

The printer unit 1-12 can perform color recording by an ink jet recording system. Ink cartridges to be loaded include ones for black and white recording, color recording, high-definition color recording, and so on. The type of a loaded cartridge is detected by a sensor provided in the printer unit 1-12, and recognized by the CPU 1-1 through a printer interface. The communication apparatus further comprises a general-purpose interface 1-13, and a CPU bus 1-14.

Figure 2:
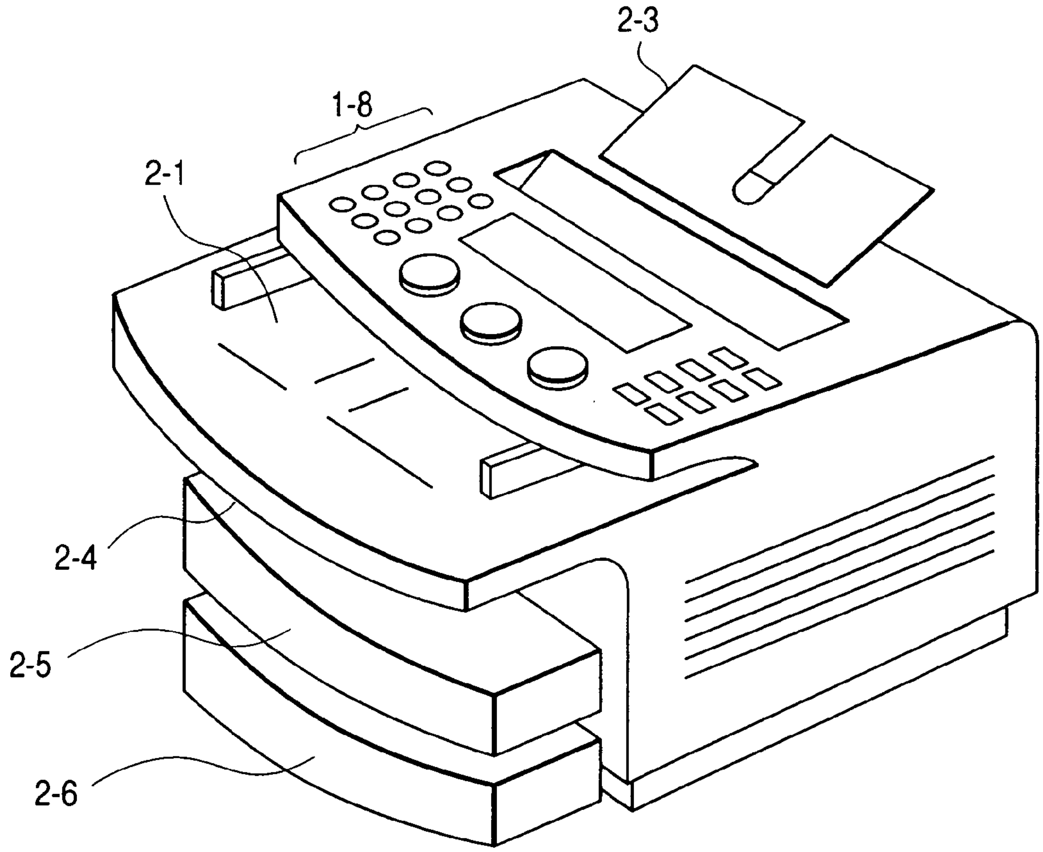
FIG. 2 is a perspective view showing an appearance of the color image communication apparatus.
Figure 3:
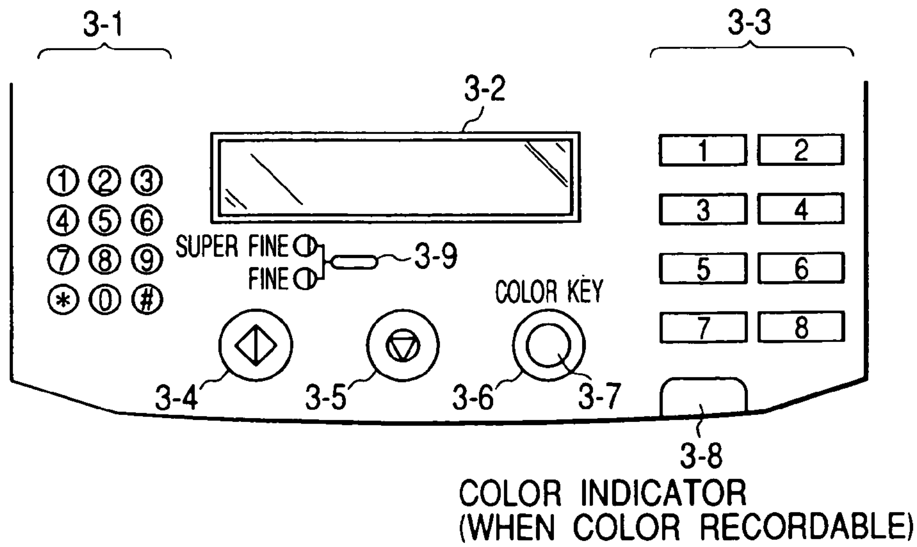
FIG. 3 is a plan view showing an operation panel of the color image communication apparatus.

FIG. 2 is a perspective view showing an appearance of the described communication apparatus, and FIG. 3 is a plan view showing an appearance of the operation panel 1-8.

In FIG. 1, a document base 2-1 for setting documents are provided on the upper surface of a device casing, and a document guide is provided to prevent oblique feeding during document carrying. The operation panel 1-8 is provided above the document base. A document ejection tray 2-3 is provided in the rear side of the operation panel 1-8. In the front face of the device casing, a recording paper ejection unit 2-4 is provided. Below the ejection unit 2-4, first and second recording paper cassettes 2-5 and 2-6 are loaded to set recording paper sheets. For example, A4-size paper sheets can be set in the first cassette 2-5; and letter-size paper sheets in the second cassette 2-6. The size or type of recording paper kept in each cassette can be recognized by a sensor (not shown).

In FIG. 3, a ten key 3-1 is composed of 12 types of keys including numerals 0 to 9 and symbols # and *, and mainly used as input unit for telephone numbers. In an LCD display unit 3-2, display is made to verify the entry of a device state or a telephone number.

A one-touch key 3-3 is used when a destination number or the like written beforehand in the RAM 1-3 and transmitted with one operation. A start key 3-4 instructs transmission start, and so on, and a stop key 3-5 is used when an on-going operation is stopped.

A color key 3-6 instructs processing for a color document, and lamps are respectively attached to the outer frame portion and the inner side of the key 3-6. Color communications are enabled by depressing this key. Switching is made between color processing and monochrome process for each depressing of the key. A reference numeral 3-7 denotes the lamp attached to the inner side of the color key 3-6. A color indicator lamp 3-8 is lit while the printer unit 1-12 is in a color recordable state.

A resolution selection key 3-9 is used to change resolution for reading a document, and a state is changed for each depressing of this key. Control is performed so as to enable the coarseness of an image transmitted by using the resolution selection key 3-9 to be adjusted.

Figure 4:
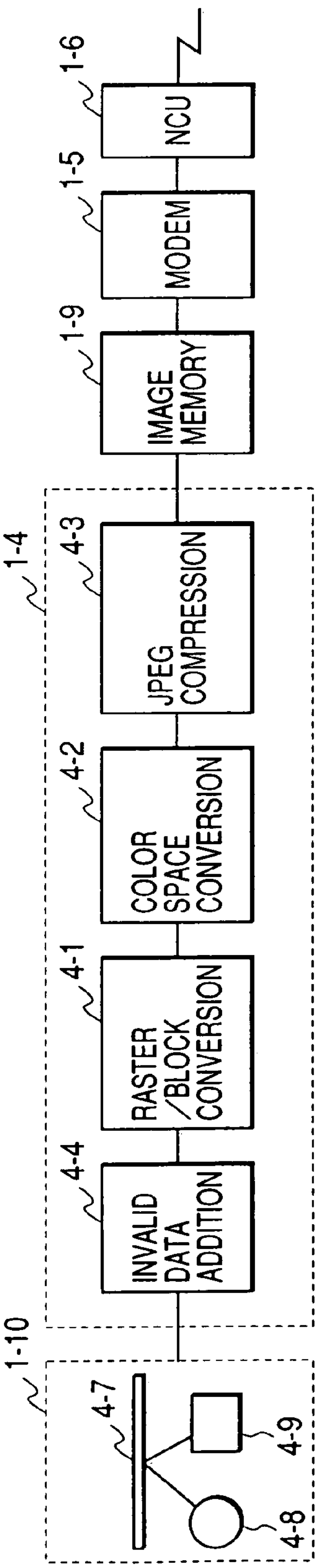
FIG. 4 is a block diagram showing a data flow during image transmission.
Figure 5:
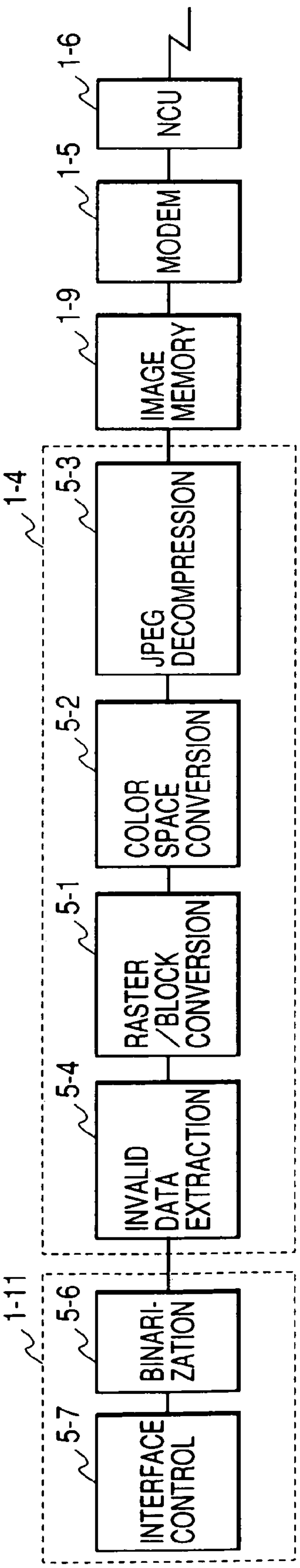
FIG. 5 is a block diagram showing a data flow during image reception.

FIG. 4 is a block diagram illustrating the flow of transmitted image data according to the embodiment; FIG. 5 a block diagram illustrating the flow of received image data. Now, description will be made by sequentially referring to FIGS. 4 and 5.

First, during transmission, a document 4-7 is read at the color scanner unit 1-10 including a color contact sensor 4-9 by a white color light source 4-8. Each analog signal decomposed in three primary colors of RGB is converted into 8-bit digital data for each color, and then outputted from the scanner unit 1-10 onto the CPU bus.

In the case of color reading, image data is entered through the CPU bus to the codec unit 1-4, and full-white data is added as invalid data to a portion exceeding a document effective size so as to reach a main scanning size of a page defined by ITU-T Recommendation in the buffer memory 4-4 of the codec unit 104. Then, the data is subjected to raster/block conversion at a raster/block conversion unit 4-1.

In this raster/block conversion, since 8-bit data are transferred in the order of R, G and B as raster signals, these data are re-arrayed in the block matrix of 8×8 pixels for respective components to form data of block sequence, i.e., in the order of R block, G block, B block, R block, and so on.

Subsequently, L*a*b* block sequence data are obtained from RGB by performing widely-known color space conversion for the RGB data of the block sequence at a color space conversion unit 4-2. JPEG encoding is carried out for this data stream, and outputted from the codec unit 1-4 to the image memory 1-9. The JPEG coded data stored in the image memory 1-9 is transferred to a modern unit 105, and transmitted from an NCU 1-6 to a communication line.

Next, the flow of image data during a reception operation will be described by referring to FIG. 5.

Image data received from the line through the NCU 1-6 and the modem unit 1-5 is temporarily entered to the image memory 1-9. In the case of a color image, it is transferred from the image memory 1-9 to the codec unit 1-4.

In the codec unit 1-4, the received data is first decoded at a JPEG base line decoding unit 5-3. L*a*b* block sequence data are obtained, and then these data are converted into the block sequence data of cyan, magenta and yellow (CMY) color space at a color space conversion unit 5-2.

Then, the CMY block sequence data are sequentially converted into raster data streams of respective CMY colors at a block/raster conversion unit 5-1, an effective image data area thereof being extracted at a buffer memory 5-4, and then outputted to the printer interface unit 1-11. In the printer interface unit 1-11, each of the entered data streams is computed to extract a black component, separated into CMYK colors, binarized and transferred to the printer unit 1-1.

No mention is necessary for a method used in the foregoing process to generate CMYK color binary raster data at the end from L*a*b* multivalued block data, because it has already been known widely.

Figure 6:
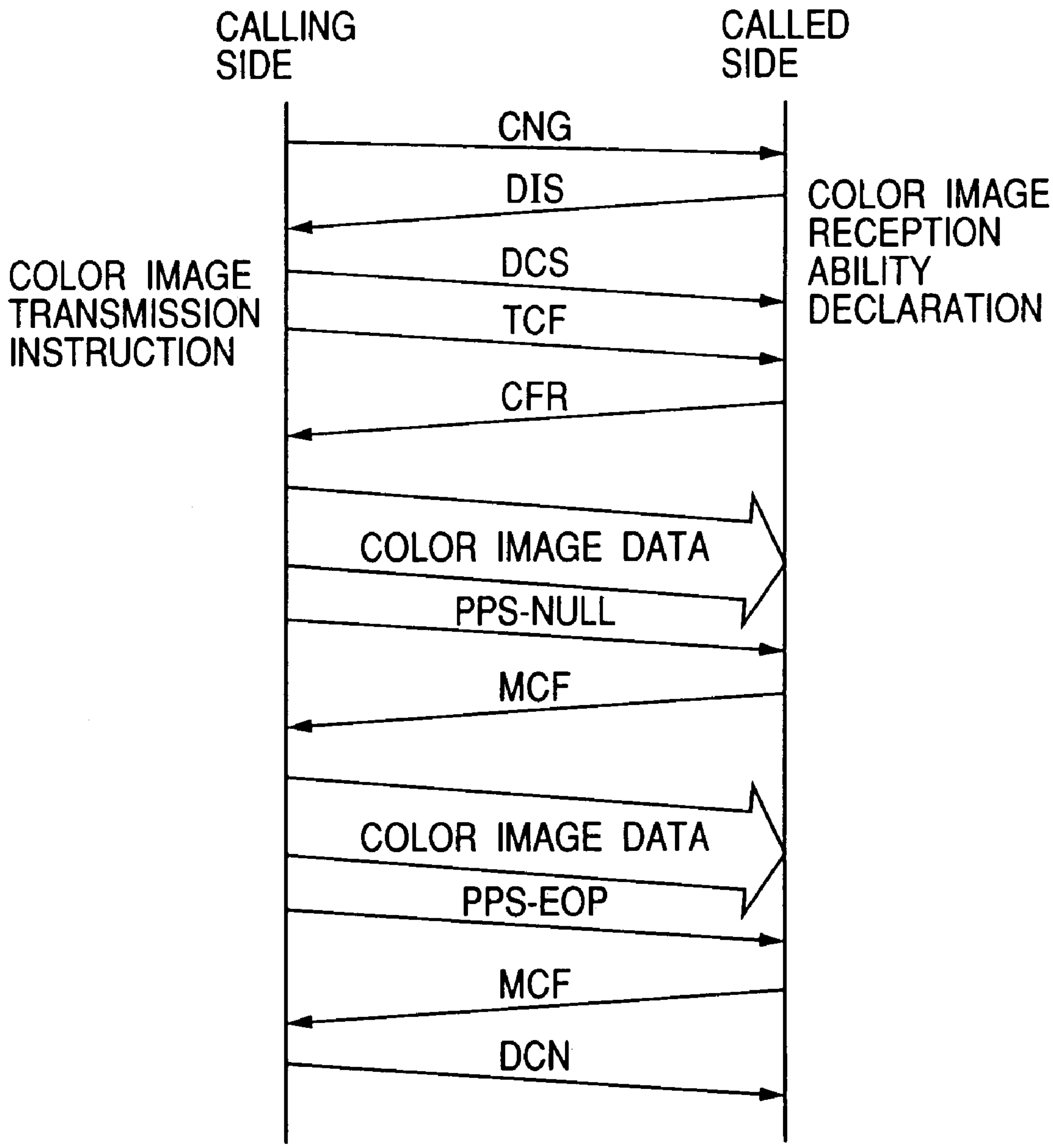
FIG. 6 is a view showing a color communication process.

FIG. 6 is a view showing an example of a color image communication process, which is a basic flow based on ITU-T T30 Recommendation. At phase B, a called side (receiving side) declares color image reception ability as the ability of its own terminal by a DIS signal (self machine ability declaration signal) if color reception is enabled. A calling side (transmitting side) verifies, in the case of color transmission, the color reception ability of a receiver, and instructs color image transmission by a DIS signal. At phase C, color image data subjected to JPEG encoding and compression is divided by ECM block units and then transmitted.

Figure 7:
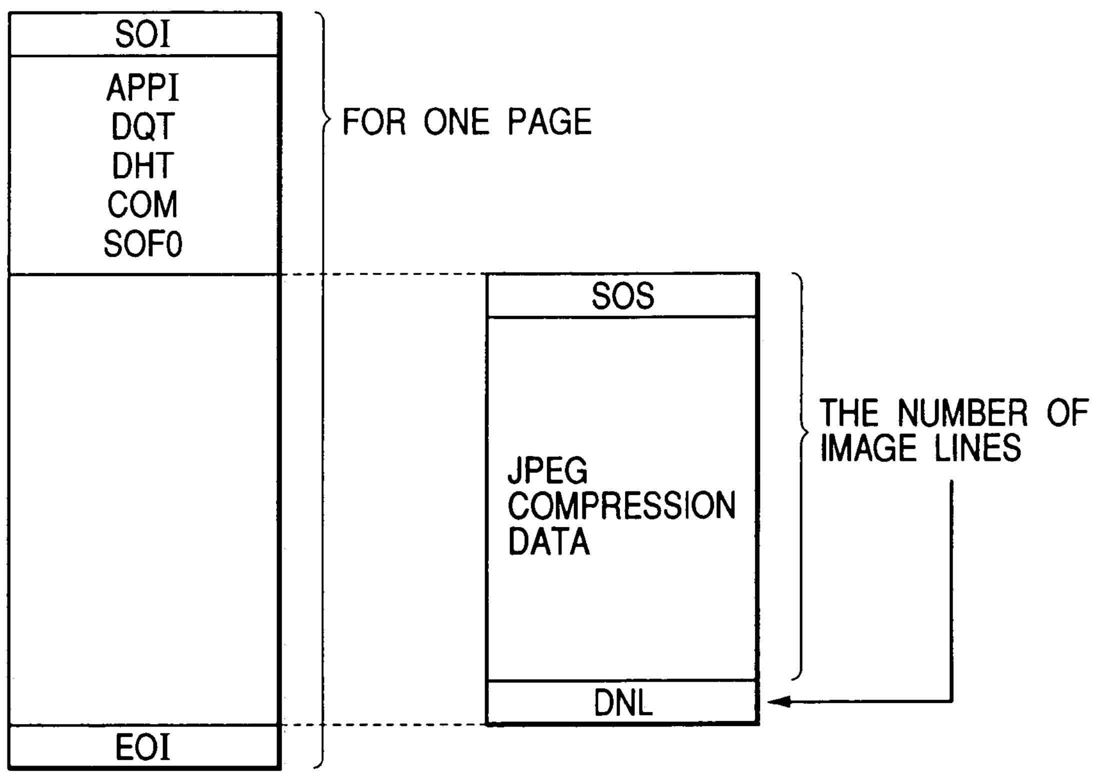
FIG. 7 is a view showing a data structure of JPEG base line coded data.

FIG. 7 is a view showing an example of a data structure regarding JPEG encoded data in color image communications based on ITU-T T14 and T81 Recommendations.

One-page data is composed of an image frame held between SOI and EOI markers. This image frame is divided into a so-called JPEG header section including APP1, DQT, DHT, COM, SOF0 markers, and so on, after SIO, and a JPEG compression data section starting from an SOS marker.

In the color communication process based on ITU-T T30 and T4 Recommendations, the method of using the APP1 maker is defined as G3 FAX. The DQT marker defines a quantization table for JPEG compression, and an image compression rate/image quality is changed by this quantization table. The DHT marker defines Huffman table. The COM marker is one, in which comments can be written. This COM marker can be ignored during decoding according to ITU-T T4 Recommendation. The SOF0 marker defines various parameters for base line DCT compression, and includes the numbers of main and sub scanning pixels of image data. Because of a facsimile configuration, if the number of sub-scanning pixels is indefinite during the JPEG compression of image data, the number of sub-scanning pixels on the SOF0 marker is set equal to 0 and, after the compression data section started with the SOS marker, the number of sub-scanning pixels of the compressed image data can be set again by a DNL marker.

Next, the embodiment of the invention will be described by referring to FIGS. 8, 9, 10 and 11.

Figure 8:
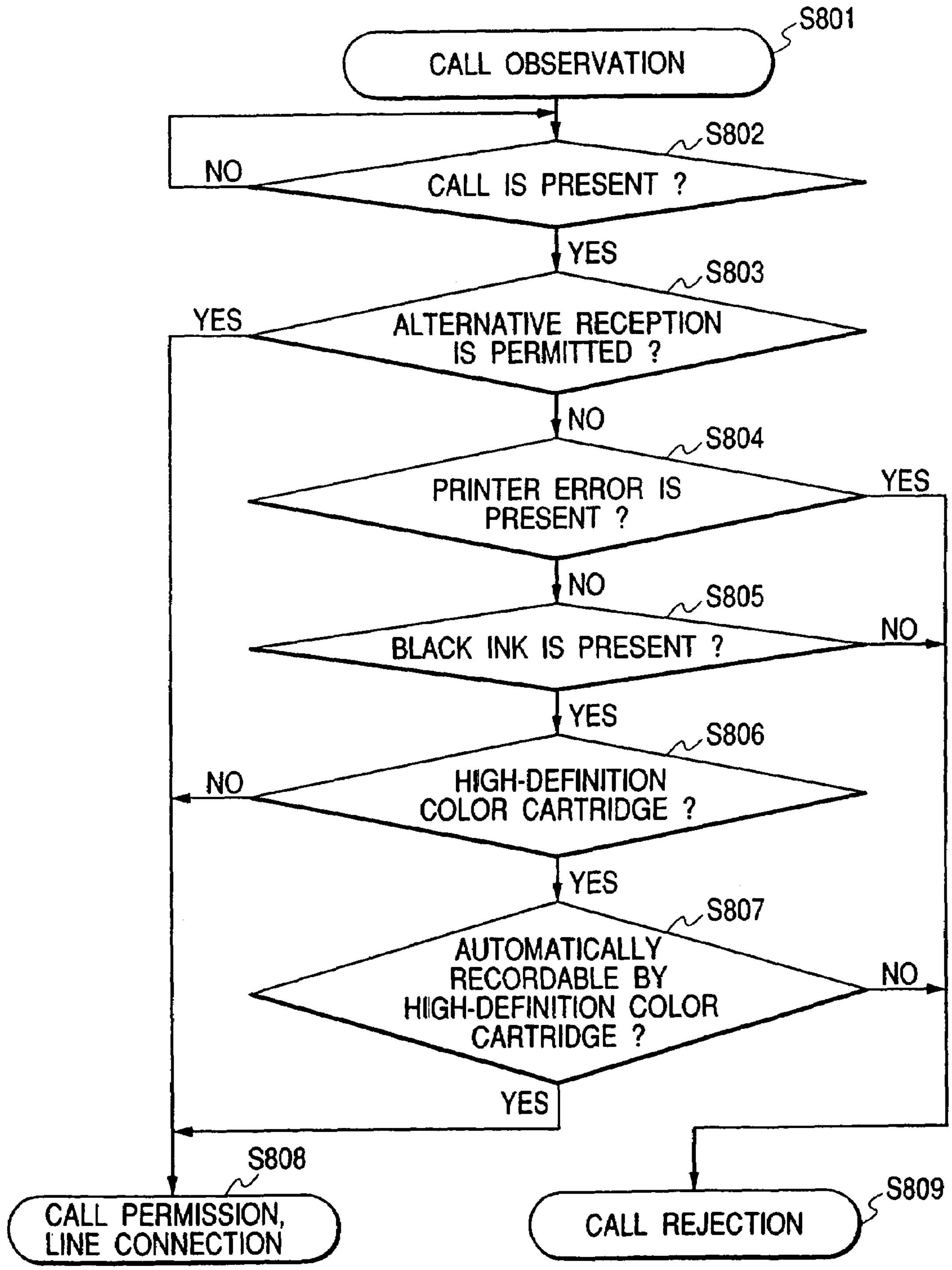
FIG. 8 is a flowchart showing a process during call incoming.

FIG. 8 is a flowchart showing an operation during call incoming.

In S802, a call incoming from the line is monitored and, if a call is present, then judgement is made as to the reception of the call.

First, in S803, based on alternative memory reception permission SW to be set beforehand, a user judges whether setting has been made or not to permit alternative memory reception when a received document can not be recorded because of no paper sheets, paper jamming, no ink or the like. If alternative memory reception is permitted, a call is received in S808, connection is made to the line, and a facsimile reception operation is executed thereafter. If alternative memory reception is not permitted, then in S804, the state of the printer is monitored, and judgement is made as to the presence of a printer error such as no recording paper, no cartridges or the like. If a printer error is present, call rejection is executed in S809 because a received document cannot be recorded. If no printer errors are present, another judgement is made as to the availability of black ink of a loaded cartridge in S805. If there is no black ink, call rejection is also executed in S809 because a facsimile document cannot be recorded. Subsequently, whether the loaded cartridge is a high-definition cartridge or not is determined. If not a high-definition cartridge, call reception is executed in S808. In the case of a high-definition cartridge, however, in S807, based on SW to be set beforehand, the user judges whether setting has been made or not to automatically record the received document (including black and white document) by using the high-definition color cartridge. If the automatic recording of the received document is not carried out by using the high-definition cartridge, call rejection is executed in S809. If the received document is recordable with the high-definition cartridge, call reception is executed in S808.

Figure 9:
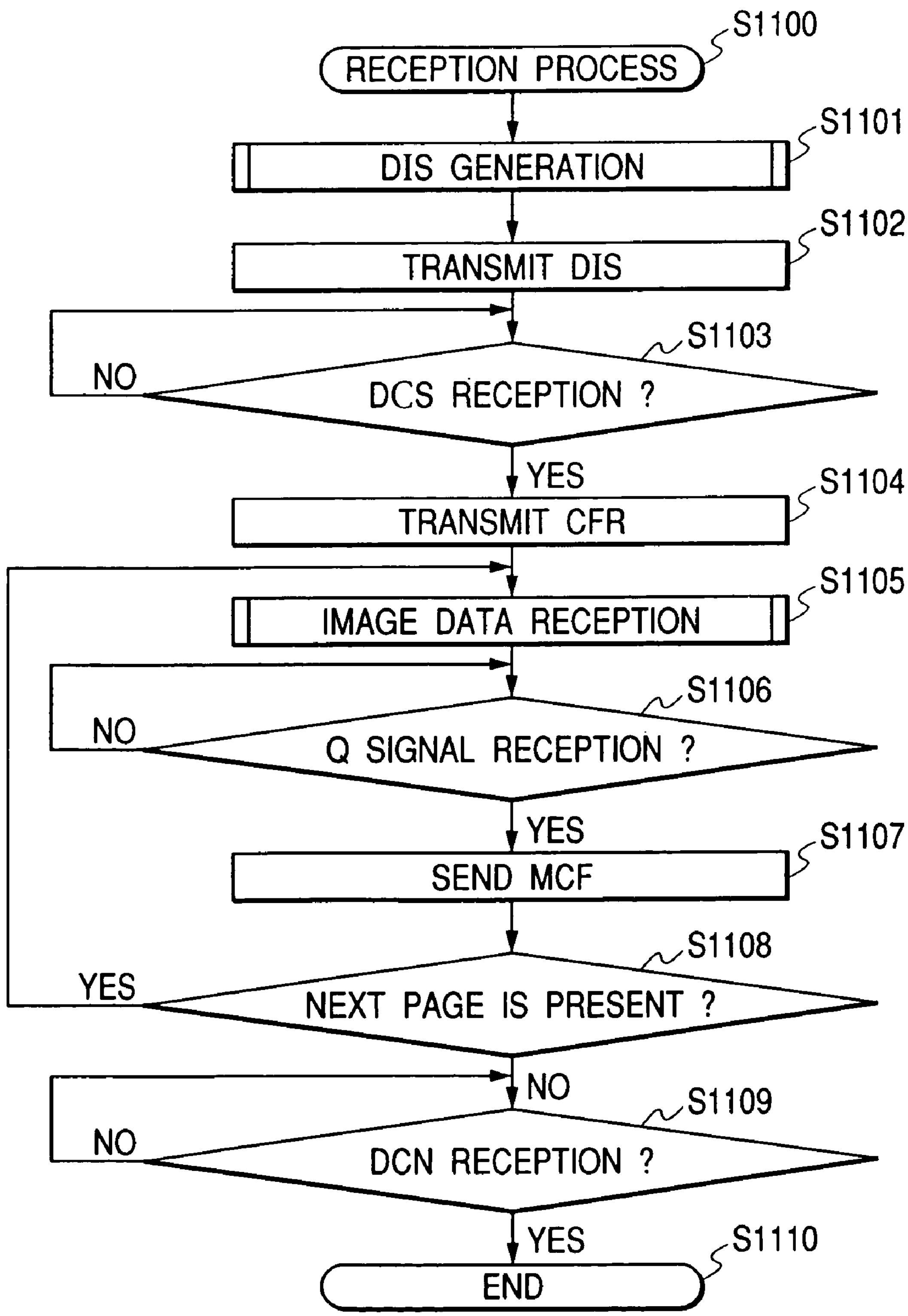
FIG. 9 is a flowchart showing a process during reception.

FIG. 9 is a flowchart showing a receiving operation after the call is received and the line is connected. First, after a response is made to the call (S1100), DIS signal generation (see FIG. 10) is executed (S1101), and a DIS signal is transmitted (S1102). Then, the process is placed on standby for a DCS signal from the transmitting side (S1103) and, if reception is permitted, a CFR signal is transmitted (S1104). Then, image data is received (see FIG. 11), and the received data is stored in the image memory (S1105). Upon receiving a Q signal from the transmitting side (S1106), an MCF signal verifying reception is sent out (S1107). Based on the Q signal, whether a next page is present or not is determined (S1108). If there is a next page, the process is repeated from S1105 or S1101. If a next page is absent, upon receiving a DCN signal (S1109), the communications are ended.

Figure 10:
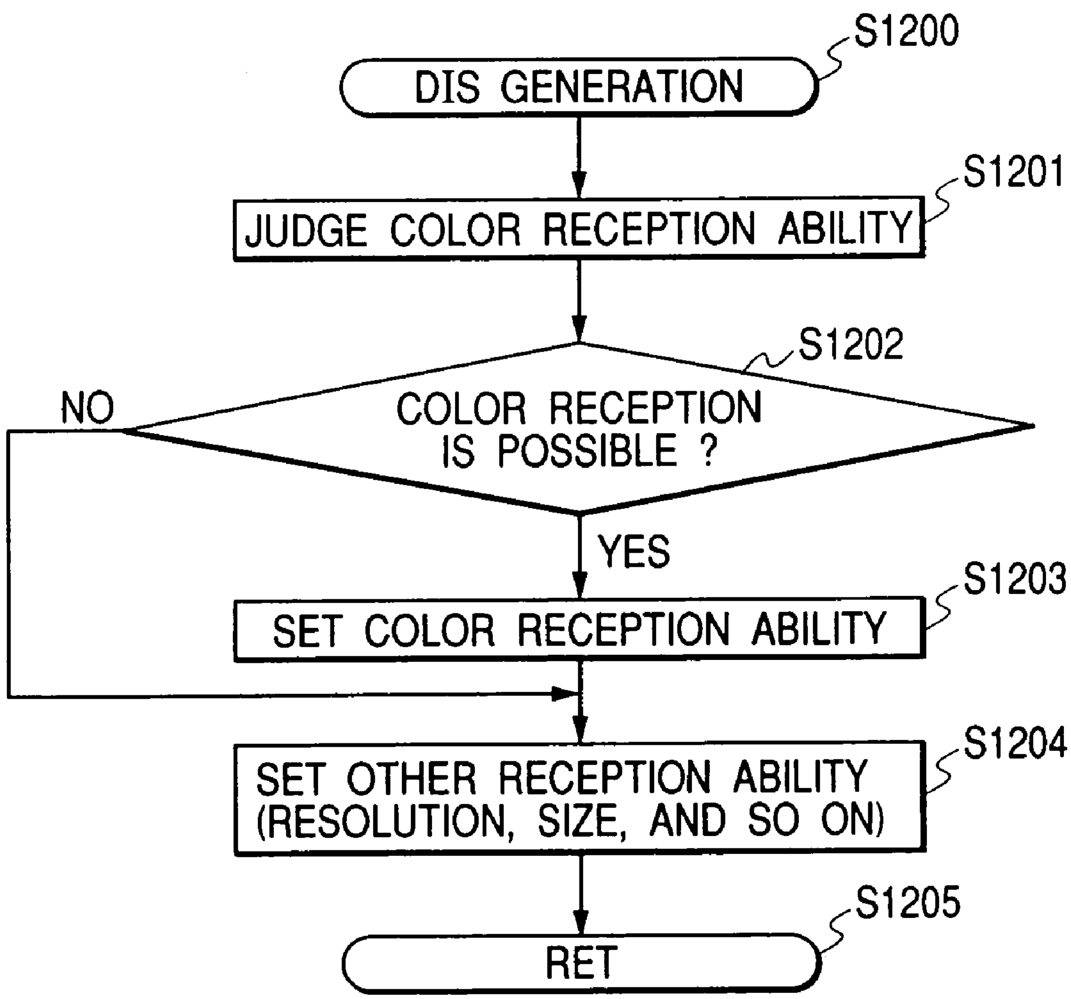
FIG. 10 is a flowchart showing a DIS signal generation process during reception.

FIG. 10 is a flowchart showing the foregoing DIS signal generation (S1101).

First, judgement is made as to whether color reception is enabled or not as a reception ability (S1201, and S1202). The judgement as to the color reception ability of the embodiment will be described later by referring to FIG. 11. If color reception is impossible, skipping steps to $S_{1204}$, a reception ability declaration parameter (resolution, recording paper size or the like) other than the color reception ability is set for the DIS signal. If color reception is enabled, then a parameter indicating the color reception ability is set for the DIS signal (S1203), a reception ability declaration parameter other than the color reception ability is set for the DIS signal (S1204), and then the DIS signal generation is finished.

Figure 11:
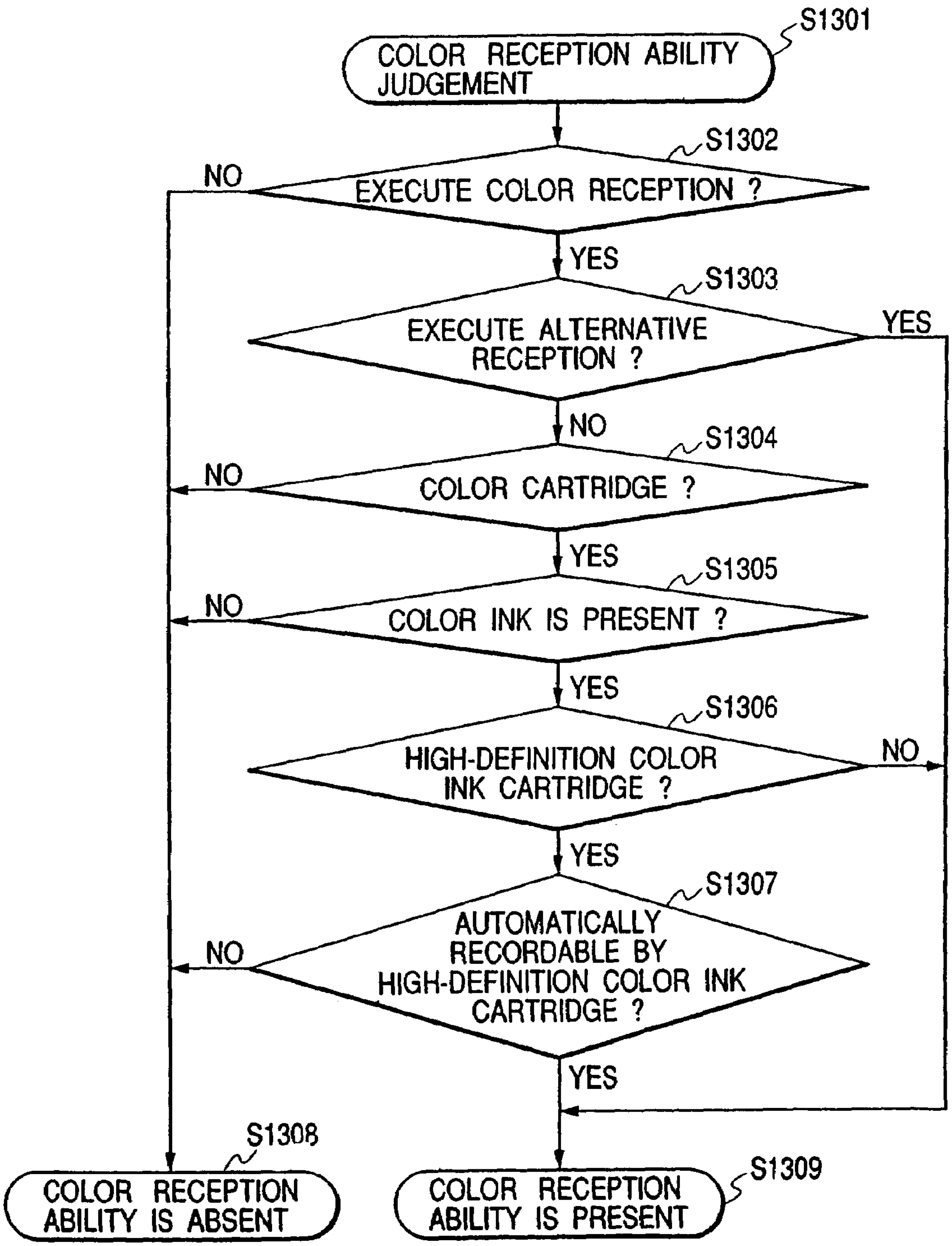
FIG. 11 is a flow chart showing a color reception ability judgement process during reception.

FIG. 11 is a flowchart showing the foregoing color reception ability judgement of S1201.

In S1302, based on color reception permission SW to be set beforehand, the use judges whether setting has been made or not to enable color reception. If color reception is impossible, in S1308, the process is finished understanding that a color reception ability is absent. If color reception is enabled, in S1303, based on alternative memory reception permission SW to be set beforehand, the user judges whether setting has been made to not to permit alternative memory reception of the received image. If alternative memory reception is permitted, in S1309, the process is finished understanding that a color reception ability is present. If alternative memory reception is not permitted, then in S1304, by cartridge judging unit, determination is made as to the loading of a color cartridge in the printer unit. If no color cartridges are loaded, in S1308, the process is finished understanding that a color reception ability is absent. If a color cartridge is loaded, in S1305, by color ink residual quantity detecting unit, judgement is made as to the no-ink state of any one of color ink in the loaded color cartridge. If any one of color ink is absent, then in S1308, the process is finished understanding that a color reception ability is absent. If no color ink is absent, then in S1306, whether the loaded color cartridge is a high-definition color cartridge or not is determined. If it is a normal color cartridge, then in S1309, the process is finished understanding that a color reception ability is present. If it is a high-definition color cartridge, then in S1307, based on automatic recording permission SW with the high-definition color cartridge to be set beforehand, the user judges whether setting has been made or not to enable the automatic recording of the received document by using the high-definition color cartridge. If the automatic recording of the received document by using the high-definition color cartridge is enabled, then in S1309, the process is finished understanding that a color reception ability is present. If the automatic recording of the received document by using the high-definition color cartridge is not enabled, then in S1308, the process is finished understanding that a color reception ability is absent.

OTHER EMBODIMENTS

The embodiment has been described with particular reference to the facsimile device conducted in such a manner that one of the monochrome cartridge, the color cartridge and the photographic recording high-definition color cartridge (hypochromic cartridge) can be selectively loaded.

However, the invention is not limited to such. For example, even in the case of the facsimile device capable of selectively loading any one of the monochrome cartridge and the color cartridge, the object of the invention can be achieved by skipping all the steps of checking the hypochromic cartridge in the foregoing process.

The embodiment has also been described by the taking the example of the facsimile device using the recording unit based on the ink jet system. However, the invention is not limited to such. For example, the object of the invention can be achieved by using a laser beam color printer based on an electrophotographic system for the recording unit, and providing the printer with, e.g., a mechanism, which enables the user to selectively load one of a toner color cartridge for monochrome recording, a color toner cartridge for general color recording and a superfine particle color toner cartridge for high-definition recording.

According to the foregoing embodiments, especially one based on the ink jet recording system, a high density and high definition can be achieved for recording by providing unit (e.g., an electrothermic converter, a laser light or the like) for generating thermal energy as energy used for ink discharging, and using a system to cause a change in the ink state by the thermal energy.

As regards a representative configuration and principle thereof, for example, one of basic principles disclosed in U.S. Pat. No. 4,723,129 and No. 4,740,796 should preferably be used. This system can be applied to both of on-demand and continuance types. The on-demand type is particularly effective in that by applying at least one driving signal to the electrothermic converter correspondingly arranged on a sheet or a liquid path holding liquid (ink), the signal being for giving a rapid temperature increase exceeding film boiling corresponding to recording information, thermal energy is generated in the electrothermic converter, and film boiling is caused to occur on the heat application surface of a recording head and, as a result, air bubbles can be formed in the liquid (ink) corresponding one to one to the driving signal. The growth/compression of the air bubbles discharges the liquid (ink) through a discharge opening, forming at least one drop. The pulse formation of this driving signal is more preferable, because it instantly causes proper growth/compression of the air bubbles, achieving liquid (ink) discharging with particularly high responsiveness.

As regards a pulse-shaped driving signal, suitable one may be selected from those described in U.S. Pat. No. 4,463,359 and No. 4,345,262. If conditions described in the invention disclosed in U.S. Pat. No. 4,313,124 regarding the temperature increase rate of the heat application surface, much better recording can be carried out.

As regards the configuration of the recording head, in addition to the foregoing configuration combining the discharge port, the liquid path and the electrothermic converter, a configuration including a heat application surface arranged in a bent region, disclosed in U.S. Pat. No. 4,558,333, and a configuration disclosed in U.S. Pat. No. 4,459,600 are also included in the present invention. In addition, one may also be selected from Japanese Patent Application Laid-Open No. 59-123670 (1984) disclosing a configuration where a slot common among a plurality of electrothermic converters is set as a discharge portion thereof, and Japanese Patent Application Laid-Open No. 59-138461 (1984) disclosing a configuration where an opening for absorbing the pressure wave of thermal energy is set corresponding to a discharge portion.

Further, for a full-line type recording head having a length corresponding to a maximum recording medium width, in which a recorder can perform recording, one may be selected from a configuration like that disclosed in the foregoing publication, satisfying the length by using a plurality of recording heads in combination, and a configuration using one integrally formed recording head.

In addition, one may be selected from the recording head of a cartridge type including an ink tank integrally provided in the recording head itself described above with reference to the embodiment, and the recording head of a freely changeable chip type, which is loaded on the device main body to enable electrical connection to be made to the device main body, and ink to be supplied therefrom.

The addition of recovery unit, alternative unit, and so on for the recording heat to the foregoing recorder configuration is preferable, because a recording operation can be made more stable. Specifically, capping unit, cleaning unit, pressure or suction unit, alternative heading unit such as an electrothermic converter, a heading device different from the electrothermic converter or a combination of these are available for the recording head. The addition of an alternative discharge mode for performing discharging separate from recording is also effective for stable recording.

Ink may be one hardened at a room temperature or lower, or one softened or liquefied at the room temperature. Alternatively, in the case of the ink jet system, since ink itself is subjected to temperature control such that ink viscosity can be kept within a stable discharge range by making a temperature adjustment within the range of 30° C. to 70° C., any can be used at the time of imparting a recording signal to be used as long as ink is a liquid form.

In addition, ink hardened in a left state and liquefied by heating may be used to actively prevent a temperature increase caused by thermal energy by using it for the state change of ink from solid to liquid, or to prevent ink evaporation. In any case, the invention is applicable to the use of ink liquefied by the application of thermal energy according to a recording signal and discharged in a liquid form, or ink having a characteristic of being never liquefied before the application of thermal energy, such as one, hardening thereof having already been started at a point of time when the recording medium is reached. In such a case, the ink may be placed oppositely to the electrothermic converter in the state of being held in a liquid or solid form in the porous sheet concave portion or the through-hole like that disclosed in Japanese Patent Application Laid-Open No. 54-56847 (1979) or Japanese Patent Application Laid-Open No. 60-71260 (1985). In the invention, a most effective method for each of the foregoing ink is the execution of the film boiling system.

As regards the recorder of the invention, in addition to one provided unitedly or separately as the image output terminal of an information processor such as a computer, a copying device combined with a reader or the like may be employed.

The invention may be applied to a system composed of a plurality of devices (e.g., a host computer, an interface device, a reader, a printer, and so on), or to a device composed of one equipment (e.g., a copying machine, a facsimile device or the like).

Needless to mention, the object of the invention can also be achieved by supplying a storage medium (or a recording medium) containing a software program code recorded to realize the function of the foregoing embodiment to the system or the device, and causing the computer (or CPU, MPU) of the system or the device to read the program code stored in the storage medium and execute it. In this case, the program code itself read from the storage medium realizes the function of the embodiment, and the storage medium having stored the program code constitutes the present invention. In addition to the realization of the function of the embodiment, needless to mention, the execution of the program code read by the computer causes an operating system (OS) or the like running on the computer to partially or entirely execute actual processing based on the instruction of the program code, and the function of the embodiment can be realized by such processing.

Further, needless to mention, the program code read from the storage medium is written in a function expansion card inserted into the computer or a memory provided in a function expansion unit connected to the computer, and then based on the instruction of the program code, actual processing is partially or entirely executed based on the function expansion card or by a CPU provided in the function expansion unit, and the function of the embodiment can be realized by such processing.

As apparent from the foregoing, according to the embodiment of the invention, the switch is provided to enable the user to select the execution or non-execution of color reception. If the user selects the non-execution, by making no color reception ability declaration during reception, only a black and white image can be received.

The unit is provided to identify the type of a cartridge, and the switch is provided to enable the user to select the permission or non-permission of alternative memory reception. Thus, by using these in combination with the switch for selecting the execution of the color reception, the user can choose setting to prevent color image reception when an ink cartridge is a black only cartridge (color reception is executed, but alternative reception is not), or setting to execute alternative memory reception of a color image (color reception is executed, and alternative reception is also executed).

The unit is also provided to detect the residual quantity of each color ink contained in a loaded color cartridge. If there is black ink while any of the other is not remaining, by using the switch for selecting the permission of alternative memory reception, the user can choose setting to prevent color image reception (color reception is executed, but alternative reception is not), or setting to execute alternative memory reception of a color image (color reception is executed, and alternative reception is also executed).

The switch is provided to select the automatic recording of a received image by using the high-definition color ink cartridge. Thus, when the expensive high-definition color ink cartridge is loaded, the user can choose the execution or non-execution of automatic recording. By using this switch in combination with the switch for selecting the permission of alternative memory reception, the user can choose setting to prevent color image reception (no automatic recording is executing by using the high-definition cartridge, and nor alternative reception), or setting to execute alternative memory reception of a color image (no automatic recording is executed by using the high-definition cartridge, but alternative reception is executed).

Therefore, since color reception is not permitted when there is no color ink cartridge loaded in the printer unit, the execution of alternative memory reception of a received color image can be prevented, and a reduction in a processing speed caused by a limitation placed on a usable memory can be prevented. In addition, since the usable memory needs to have only an area of a minimum necessary limit, a memory capacity can be saved, making it possible to reduce device costs. Moreover, since a color cartridge is expensive, user's request of no color reception in facsimile reception can be satisfied.

What is claimed is:

1. A color image communication apparatus comprising:

a communication circuit for performing communications with an opposite device;

a printer unit, in which a color cartridge for normal color printing or a high-definition color cartridge for high-definition color printing is selectively loaded, for color or monochrome-printing an image received by the communication circuit on a recording medium;

a memory for storing the image;

detecting means for detecting a state of the printer unit;

setting means for setting validation or invalidation of an alternative memory reception function to store the received image in the memory if printing is inexecutable in the printer unit;

presetting means for presetting permission or non-permission of received image printing carried out by using the high-definition color cartridge; and communication control means for performing control as to whether color reception ability declaration is made in self machine ability declaration, said control being performed during call incoming according to a detecting result of the detecting means, if the alternative memory reception function is set to be invalid by said setting means, wherein, even when said setting means invalidates alternative memory reception and said detecting means detects that the printer unit is in a state capable of performing printing, if said presetting means presets non-permission of received image printing by the high-definition color cartridge, said communication control means controls such that the color reception ability declaration is not made.

2. A color image communication apparatus according to claim 1, wherein if the detecting means detects the inexecutable state of printing in the printer unit, the communication control means rejects a call.

3. A color image communication apparatus according to claim 1, wherein the communication control means makes color reception ability declaration if the color printing is enabled in the printer unit, and does not make color reception declaration if color printing is inexecutable while monochrome printing is enabled.

4. A control method of a color image communication apparatus including a communication circuit for performing communications with an opposite device, a printer unit, in which a color cartridge for normal color printing or a high-definition color cartridge for high-definition color printing is selectively loaded, for color or monochrome-printing an image received by the communication circuit on a recording medium, and a memory for storing the image, comprising the steps of:

setting validation or invalidation of an alternative memory reception function to store the received image in the memory if printing is inexecutable in the printing unit;

presetting permission or non-permission of received image printing carried out by using the high-definition color cartridge;

detecting a state of the printer unit; and performing control as to whether color reception ability declaration is made in self machine ability declaration, said control being performed during call incoming according to a detecting result in the detecting step, if the alternative memory reception function is set to be invalid in the setting step, wherein, even when said setting step invalidates alternative memory reception and said detecting step detects that the printer unit is in a state capable of performing printing, if said presetting step presets non-permission of received image printing by the high-definition color cartridge, said communication control step controls such that the color reception ability declaration is not made.

5. A control method according to claim 4, wherein if an inexecutable state of printing of the printer unit is detected in the detecting step, a call is rejected.

6. A control method according to claim 4, wherein color reception ability declaration is made in self machine ability declaration if color printing is enabled in the printer unit, and color reception ability declaration is not made if color printing is inexecutable while monochrome printing is enabled.

7. A computer readable storage medium storing:

a program used to cause a color image communication apparatus to execute processing steps, the color image communication apparatus including a communication circuit for performing communications with an opposite device, a printer unit, in which a color cartridge for normal color printing or a high-definition color cartridge for high-definition color printing is selectively loaded, for color or monochrome-printing an image received by the communication circuit on a recording medium, and a memory for storing the image, and said program comprising the processing steps of:

setting validation or invalidation of an alternative memory reception function to store the received image in the memory if printing is inexecutable in the printer unit;

presetting permission or non-permission of received image printing carried out by using the high-definition color cartridge;

detecting a state of the printer unit; and performing control as to whether color reception ability declaration is made in self machine ability declaration, said control being performed during call incoming according to a detecting result in the detecting step, if the alternative memory reception function is set to be invalid in the setting step, wherein, even when said setting step invalidates alternative memory reception and said detecting step detects that the printer unit is in a state capable of performing printing, if said presetting step presets non-permission of received image printing by the high-definition color cartridge, said communication control step controls such that the color reception ability declaration is not made.

8. A color image communication apparatus comprising:

a communication circuit for performing communications with an opposite device;

a printer unit, in which a color cartridge for normal color printing or a high-definition color cartridge for high-definition color printing is selectively loaded, for color or monochrome-printing an image received by the communication circuit on a recording medium;

a memory for storing the image;

detecting means for detecting a state of the printer unit;

setting means for setting validation or invalidation of an alternative memory reception function to store the received image in the memory;

presetting means for presetting permission or non-permission of received image printing carried out by using the high-definition color cartridge; and communication control means for performing control as to whether color reception ability declaration is made in self machine ability declaration, said control being performed during call incoming according to a detecting result of the detecting means, if the alternative memory reception function is set to be invalid by said setting means, wherein, even when said setting means invalidates alternative memory reception and said detecting means detects that the printer unit is in a state capable of performing printing, if said presetting means presets non-permission of received image printing by the high-definition color cartridge, said communication control means controls such that the color reception ability declaration is not made.

9. A control method of a color image communication apparatus including a communication circuit for performing communications with an opposite device, a printer unit, in which a color cartridge for normal color printing or a high-definition color cartridge for high-definition color printing is selectively loaded, for color or monochrome-printing an image received by the communication circuit on a recording medium, and a memory for storing the image, comprising the steps of:

setting validation or invalidation of an alternative memory reception function to store the received image in the memory;

presetting permission or non-permission of received image printing carried out by using the high-definition color cartridge;

detecting a state of the printer unit; and performing control as to whether color reception ability declaration is made in self machine ability declaration, said control being performed during call incoming according to a detecting result in the detecting step, if the alternative memory reception function is set to be invalid in the setting step, wherein, even when said setting step invalidates alternative memory reception and said detecting step detects that the printer unit is in a state capable of performing printing, if said presetting step presets non-permission of received image printing by the high-definition color cartridge, said communication control step controls such that the color reception ability declaration is not made.

10. A computer readable storage medium storing:

a program used to cause a color image communication apparatus to execute processing steps, the color image communication apparatus including a communication circuit for performing communications with an opposite device, a printer unit, in which a color cartridge for normal color printing or a high-definition color cartridge for high-definition color printing is selectively loaded, for color or monochrome-printing an image received by the communication circuit on a recording medium, and a memory for storing the image, and said program comprising the processing steps of:

setting validation or invalidation of an alternative memory reception function to store the received image in the memory;

presetting permission or non-permission of received image printing carried out by using the high-definition color cartridge;

detecting a state of the printer unit; and performing control as to whether color reception ability declaration is made in self machine ability declaration, said control being performed during call incoming according to a detecting result in the detecting step, if the alternative memory reception function is set to be invalid in the setting step, wherein, even when said setting step invalidates alternative memory reception and said detecting step detects that the printer unit is in a state capable of performing printing, if said presetting step presets non-permission of received image printing by the high-definition color cartridge, said communication control step controls such that the color reception ability declaration is not made.

* * * * *

UNITED STATES PATENT AND TRADEMARK OFFICE

CERTIFICATE OF CORRECTION

PATENT NO. : 6,970,262 B2
APPLICATION NO. : 09/656015
DATED : November 29, 2005
INVENTOR(S) : Toshiaki Saito It is certified that error appears in the above-identified patent and that said Letters Patent is hereby corrected as shown below:

ON THE COVER PAGE, (75) Inventor

"Toshiaki Saito, Moriya-machi (JP)" should read --Toshiaki Saito, Ibaraki (JP)--.

COLUMN 2

Line 42, "modern" should read --modem--.

COLUMN 4

Line 12, "modern" should read --modem--; and
Line 61, "maker" should read --marker--.

COLUMN 6

Line 1, "$S_{1204}$," should read --S1204,--.

COLUMN 9

Line 44, "executing" should read --executed--, and "and nor" should read --and/or--;
Line 65, "which" should read --which one of--; and
Line 66, "or" should read --and--.

COLUMN 10

Line 38, "which" should read --which one of--, and "or" should read --and--.

COLUMN 11

Line 12, "which" should read --which one of--;
Line 13, "or" should read --and--;
Line 41, "which" should read --which one of--; and
Line 42, "or" should read --and--.

UNITED STATES PATENT AND TRADEMARK OFFICE

CERTIFICATE OF CORRECTION

PATENT NO. : 6,970,262 B2
APPLICATION NO. : 09/656015
DATED : November 29, 2005
INVENTOR(S) : Toshiaki Saito It is certified that error appears in the above-identified patent and that said Letters Patent is hereby corrected as shown below:

COLUMN 12

Line 4, "which" should read --which one of--, and "or" should read --and--.

Signed and Sealed this

Fifteenth Day of August, 2006

JON W. DUDAS

*Director of the United States Patent and Trademark Office*